J. R. DAVIS.
PISTON RING.
APPLICATION FILED AUG. 11, 1920.
1,413,521.
Patented Apr. 18, 1922.
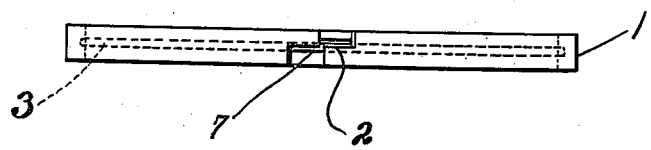
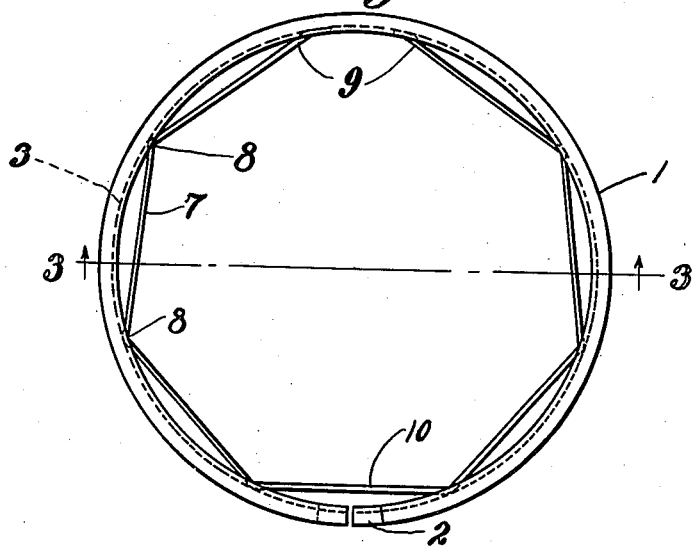
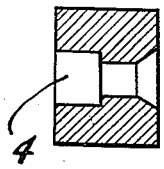
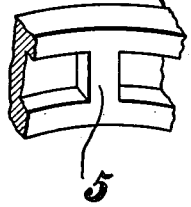
J. R. Davis,
Inventor

UNITED STATES PATENT OFFICE.

JOSEPH REX DAVIS, OF CLARKSBURG, WEST VIRGINIA, ASSIGNOR TO J. EDGAR LONG, OF CLARKSBURG, WEST VIRGINIA.

PISTON RING.

1,413,521.  Specification of Letters Patent.  Patented Apr. 18, 1922.

Application filed August 11, 1920. Serial No. 402,831.

*To all whom it may concern:*

Be it known that I, JOSEPH REX DAVIS, a citizen of the United States, residing at Clarksburg, in the county of Harrison and State of West Virginia, have invented a new and useful Piston Ring, of which the following is a specification.

The device forming the subject matter of this application is a piston ring adapted to be used on all pistons using a sealing ring and the invention aims to provide a ring which will adapt itself readily both to the bore of the cylinder, and to the circumference of the piston.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a plan; Figure 3 is a section on the line 3—3 of Figure 2; Figure 4 is a section taken on the line 4—4 of Figure 3; and Figure 5 is a fragmental perspective showing a modification.

The numeral 1 denotes a piston ring preferably made of metal. The ends of the ring 1 are halved together as indicated at 2, or are constructed otherwise, as occasion may demand. It may be expedient to form the ring 1 in sections. The ring 1 is provided with an internal groove 3. A projection 4 extends into the groove 3 at a point diametrically opposite to the ends 2 of the ring. The projection 4 may be in the form of a rivet, as indicated in Figure 4, or it may be formed integrally with the ring, as indicated at 5 in Figure 5, the ring being denoted by the numeral 6. The numeral 7 marks a polygonal spring, the angular portions 8 more or less of which are located in the groove 3, the ends 9 of the spring being located on opposite sides of the projection 4, the projection constituting means for preventing relative circumferential movement of the spring 8 with respect to the ring 1. One of the sides 10 of the spring 7 bridges the space between the ends 2 of the ring 1.

In practical operation, when the ring 1 is assembled with the piston, and when the piston is in the cylinder, the sides of the spring 7 will be curved outwardly to a considerable extent, between the angular portions 8. The construction of the device is such that an exceedingly tight fit between the ring 1 and the wall of the cylinder will take place.

Having thus described the invention, what is claimed is:—

1. In a device of the class described, a ring having relatively movable ends and provided with an internal groove, the ring having a fixed projection extended into the groove; and a polygonal spring having angular portions and ends received in the groove, the ends of the spring being located on opposite sides of the projection.

2. In a device of the class described, a ring having relatively movable ends and provided with an internal groove, the ring having a fixed projection extended into the groove, the projection being disposed diametrically opposite to the ends of the ring; and a polygonal spring having angular portions and ends received in the groove, one portion of the spring bridging the space between the ends of the ring, the ends of the spring being disposed on opposite sides of the projection.

In testimony that I claim the foregoing as my own, I have hereto affixed my signature in the presence of two witnesses.

JOSEPH REX DAVIS.

Witnesses:
 J. EDGAR LING,
 CHAS. P. BOUCHNER.